(12) United States Patent
Ibrahim et al.

(10) Patent No.: US 10,037,420 B1
(45) Date of Patent: Jul. 31, 2018

(54) CARDLESS TRANSACTIONS

(71) Applicant: American Express Travel Related Services Company, Inc., New York, NY (US)

(72) Inventors: Wael Ibrahim, San Diego, CA (US); Upendra Mardikar, San Jose, CA (US)

(73) Assignee: AMERICAN EXPRESS TRAVEL RELATED SERVICES COPMANY, INC., New York, NY (US)

( * ) Notice: Subject to any disclaimer, the term of this patent is extended or adjusted under 35 U.S.C. 154(b) by 0 days.

(21) Appl. No.: 15/597,852

(22) Filed: May 17, 2017

(51) Int. Cl.
*G06K 19/06* (2006.01)
*G06F 21/32* (2013.01)
*G06F 17/30* (2006.01)
*G06F 21/60* (2013.01)

(52) U.S. Cl.
CPC ........ *G06F 21/32* (2013.01); *G06F 17/30424* (2013.01); *G06F 21/602* (2013.01)

(58) Field of Classification Search
CPC ........... G06Q 20/341; G06Q 20/40145; G06Q 20/20; G06Q 30/06; G06Q 10/00; G06Q 20/10; G06Q 20/18; G06Q 20/32; G06Q 20/3224; G06Q 20/3278; G06Q 20/352; G06Q 20/367; G06Q 20/40; G06Q 20/4012
USPC ........................................................ 235/494
See application file for complete search history.

(56) References Cited

U.S. PATENT DOCUMENTS

| | | | |
|---|---|---|---|
| 2007/0078780 A1* | 4/2007 | Tran ........................ | G06F 21/32 705/65 |
| 2008/0040262 A1* | 2/2008 | D K ........................ | G06F 21/32 705/39 |
| 2013/0226812 A1* | 8/2013 | Landrok ................ | G06Q 20/32 705/67 |
| 2016/0086181 A1* | 3/2016 | Candelore ............ | G06Q 20/405 705/16 |
| 2016/0117673 A1* | 4/2016 | Landrok ............ | G06Q 20/3829 705/71 |
| 2017/0046714 A1* | 2/2017 | Van de Velde .. | G06Q 20/40145 |

\* cited by examiner

*Primary Examiner* — Thien M Le
(74) *Attorney, Agent, or Firm* — Snell & Wilmer, L.L.P.

(57) ABSTRACT

A system for conducting transactions without a debit card or credit card may receive a request to complete a transaction including authentication data associated with a transaction account and a captured biometric template. The transaction request may lack information contained on a typical debit card or credit card. The system may identify the transaction account using the authentication data associated with the transaction account. The transaction account may be associated with a stored biometric template stored in a biometric data store. The system may also compare the stored biometric template with the captured biometric template. In response to the stored biometric template conflicting with the captured biometric template, the system may decline the transaction.

20 Claims, 3 Drawing Sheets

US 10,037,420 B1

CARDLESS TRANSACTIONS

FIELD

This disclosure relates to transactions based on biometric data and completed without needing a transaction instrument (e.g., a debit card or credit card).

BACKGROUND

Travelers often find themselves far from home with little more than a bag and a wallet. They may carry one or two credit cards or debit cards to complete transactions. Some may even carry mobile devices provisioned with payment mechanisms associated with their transaction accounts. During their travels, many expenses arise including lodging, food and transportation.

Such critical goods and services can be taken for granted by those feeling secure in their account balances. For example, the transaction cards and mobile devices are convenient and effective while the travelers have them, but too often people lose a wallet, misplace a card, or have a mobile device stolen. People that are far away from home may find themselves alone without a mechanism to conduct purchases. The stranded individual typically cannot pay for basic needs like food, lodging or transportation without their cards or mobile devices.

Moreover, purchases for convenience may be in jeopardy, when a transaction device is not in the possession of the customer. For example, a customer looking to rent a bicycle on the beach may only be wearing a swimsuit. Without her credit card, the person may not have the ability to pay for the bicycle. The customer would have to return to her blanket area across the hot sand to retrieve the card in order to complete the transaction. Therefore, requiring cards or other media at the point of sale may inconvenience the customer.

SUMMARY

A system, method, and computer readable medium (collectively, the "system") is disclosed for conducting biometric-based transactions without needing a credit card or debit card. The system may receive a request to complete a transaction including authentication data associated with a transaction account and a captured biometric template. The transaction request may lack information contained on a typical debit card or credit card. The system may identify the transaction account using the authentication data associated with the transaction account. The transaction account may be associated with a stored biometric template stored in a biometric data store. The system may also compare the stored biometric template with the captured biometric template. In response to the stored biometric template conflicting with the captured biometric template, the system may decline the transaction.

In various embodiments, the system may transmit or otherwise communicate a bPAN (biometric payment account number) to the computing device in response to the stored biometric template matching the captured biometric template. The bPAN may have domain restriction controls based on at least one of a period, an amount, or a merchant segment. The system may receive a payment cryptogram including characteristics of the transaction with the payment cryptogram generated using the bPAN. The system may authenticate a user associated with the transaction account using at least one of an iris scan, a fingerprint scan, vocal scan, or facial scan, which may also be compatible authentication techniques with the bPAN. The system may register a biometric template in association with a user account to digitally store biometric characteristics of an account holder. The authentication data used to identify a transaction account may include a user name and a password associated with the user account. The authentication data or bPAN may also include a scratch pad. The system may use step-up authentication in response to the stored biometric template differing from the captured biometric template.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. A more complete understanding of the present disclosure, however, may be obtained by referring to the detailed description and claims when considered in connection with the drawing figures, wherein like numerals denote like elements.

DETAILED DESCRIPTION

Figure 1:
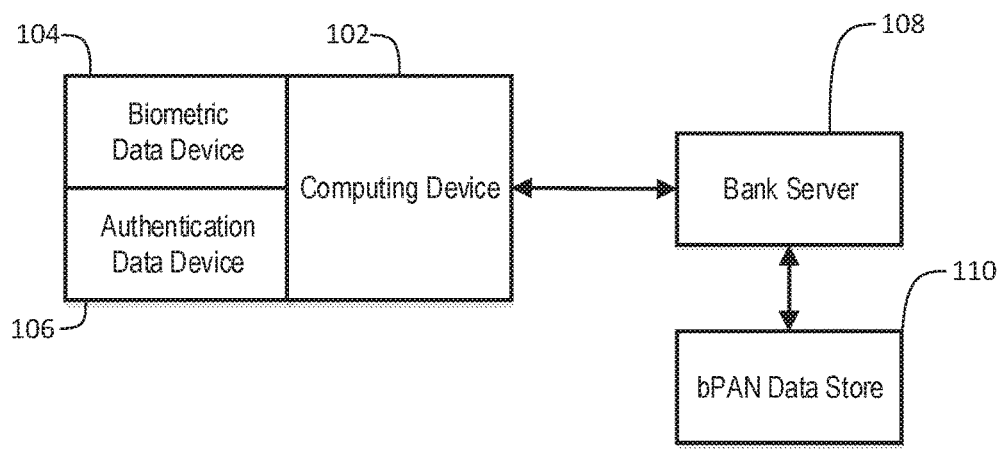
FIG. 1 illustrates an exemplary system for completing cardless transactions based on authentication of a present account holder, in accordance with various embodiments.

The detailed description of various embodiments herein makes reference to the accompanying drawings and pictures, which show various embodiments by way of illustration. While these various embodiments are described in sufficient detail to enable those skilled in the art to practice the disclosure, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

As used herein, "image template", "facial template", "fingerprint template", "template", or other similar phrases may include a digital representation and/or other representation of biometric data. A template may identify features, edges, dimensions, and other information used to identify the biometric facial, retinal, fingerprint, vocal, handwriting, gesture, or other biometric information of an individual. The template may be used by a biometric account system to identify and/or authenticate a person associated with a transaction account using a biometric device.

As used herein, "match" or "associated with" or similar phrases may include an identical match, a partial match, meeting certain criteria, matching a subset of data, a correlation, satisfying certain criteria, a correspondence, an association, an algorithmic relationship and/or the like. For example, a first template may match a second template in response to the templates being sufficiently similar to imply the biometric data of each template is likely from the same person, even though the source from which the templates are generated may not be exactly identical. Similarly, as used herein, "authenticate" or similar terms may include an exact authentication, a partial authentication, authenticating a subset of data, a correspondence, satisfying certain criteria, an association, an algorithmic relationship and/or the like.

The present disclosure includes systems, methods, and computer program products for completing transactions using a transaction account associated with biometrics, passcodes, and/or personal information to identify the account holder. The systems may approve and/or decline transactions based in part on authentication data known to the account holder such as a password, personal information and/or a security question. Transactions may include requesting a replacement card in-person at a bank, making a purchase at a point-of-sale device, or otherwise making changes or payments related to a transaction account. The systems may also approve and/or decline transactions based in part on biometric data inherent to the account holder such as facial recognition, fingerprints, voice recognition and/or retinal scans. As such, an account holder may transact without needing identification or media (e.g., a credit card, debit card, or mobile device, driver's license, or any form of ID) containing an account number.

With reference to FIG. 1, a system 100 for completing transactions without needing debit or credit cards is shown, in accordance with various embodiments. System 100 may include a computing device 102 in communication with and/or comprising a biometric device 104 and authentication device 106. Computing device 102 may take the form of a computer or processor, or a set of computers/processors, such as a computer, point-of-sale device, laptop, notebook, hand held computer, personal digital assistant, cellular phone, smart phone (e.g., iPhone®, BlackBerry®, Android®, etc.), tablet, wearable (e.g., smart watch and smart glasses), camera, or any other device capable of communicating with a biometric device 104 and/or authentication device 106 to collect identifying biometric data and authentication data for an account holder.

In various embodiments, biometric device 104 may comprise any device capable of scanning, storing, processing, capturing and/or communicating biometric templates or other digital representation of biometric data. Examples of biometric device 104 include a camera, fingerprint scanner, retinal scanner, microphone, touch pad, or other suitable biometric devices capable of capturing raw biometric data and/or biometric templates. The images, scans, recordings, and/or readings captured by biometric device may be processed into templates or other representations at computing device 102 prior to transmission to bank server 108 over the Internet. Processing the biometric data prior to transmission may protect the raw biometric data from exposure during transmission to bank server 108. Bank server 108 may include one or more computing devices such as, for example, computing nodes, distributed computing systems, application servers, computers, or other suitable computing devices.

In a small scale system (e.g., 50 users), identifying a user based on Biometrics due to false acceptance rate (FAR) and/or false recognition rate (FRR) being relatively low compared to the number of users in the small scale system. In large scale systems potentially having millions of users, using biometric identification as a first step may be challenging as the FAR and FRR rates virtually guarantee collisions and/or false recognitions when matching a user to an account. As such, the user may assist the POS by choosing the account to charge and/or entering a password or PIN, which may be subsequently authenticated with biometric data. Additionally, raw biometric data (e.g., without generating a template) may be sent in an encrypted format to the backend for more precise processing.

Authentication device 106 may comprise any device capable of inputting or outputting information about an account holder to assist in authenticating the account holder and/or identifying the associated transaction account. An authentication device may display a verbal password, characteristics of the account holder, or prompts for a bank or merchant to use in authenticating the account holder or identifying an associated account. An authentication device may also receive inputs such as, for example, a password, an answer to a security question, an account number, a social security number, or other inputs for use in authenticating the account holder or identifying an associated account. In that regard, example authentication devices may include a keyboard, monitor, and/or mouse.

Computing device 102 may be in communication with bank server 108 over an electronic communication network. The network may be local area network using TCP/IP communication, for example, or a wide area network incorporating communication over the Internet. The communication network may also be an internal network isolated from the Internet. The communication networks of system 100 may be exposed to third party attacks at various points. Computing device 102 and bank server 108 may thus communicate over the network with encrypted messages. Encryption may be performed by way of any of the techniques now available in the art or which may become available. For example, suitable encryption techniques may include Twofish, RSA, El Gamal, Schorr signature, DSA, PGP, PKI, GPG (GnuPG), or other symmetric or asymmetric algorithms. Transport level encryption such as TLS/SSL may be used in conjunction with payload encryption to further secure communications.

In various embodiments, bank server 108 may use the biometric data from an account holder in association with a biometric primary account number (bPAN) to access or identify a transaction account associated with the account holder. The bPAN may be bound to biometrics such that the bPAN is only valid for use with biometric transactions described herein. Bank server 108 may retain a mapping of bPANs to primary account numbers (PAN) associated with transaction accounts. The mapping may not be one-to-one. For example, an account may have a bPAN based on each of fingerprint features, facial features, vocal features, retinal features, a combination thereof, or a subset thereof with each bPAN mapped to the PAN for the account associated with the account holder. Biometric templates may be associated with accounts by storage in a data store with a key field corresponding to the account. In that regard, the bPAN for an account holder serves as a biometric profile granting access to the associated transaction account.

In various embodiments, a bPAN may also be provided to merchants in response to an account holder requesting a transaction based on their biometric data. The bPAN may have timing, spending, segment, or other limitations as to where and when the bPAN may be used. Domain restriction controls may be implemented upon onboarding. Examples of domain restriction controls may include a value limitation of such transactions, a value limit based on the authentication method, etc. A bank may issue one-time bPANs, for example, to merchants to complete a single transaction. A bank may also limit transactions based on bPANs to travel related merchants such as lodging, food, and transportation. The mapping may be stored in an appropriate bPAN data store 110 such as, for example, a big data file system, a relational database, or another suitable database type. Merchants may utilize the bPAN to calculate the cryptogram sent to bank servers 108 to request authorization. An example of cryptogram data may include a hash of the biometric data, transaction amount, merchant ID, time of the transaction, a nonce for reply attack prevention), an indicator that this is an "in-person" transaction," and/or an enumeration of the authentication methods.

In various embodiments, bank server may also use authentication data from the account holder to identify the transaction account associated with the individual. For example, the account holder may provide authentication data in the form of a name, user name, passphrase, date of birth, account number, address, phone number, security questions, or other authentication data to identify a transaction account associated with an individual. For example, the authentication data may be used to select records associated with the account holder from a database. The records may include biometric data suitable for use in further authenticating the account holder by comparison to biometric data captured by biometric device 104.

Figure 2:
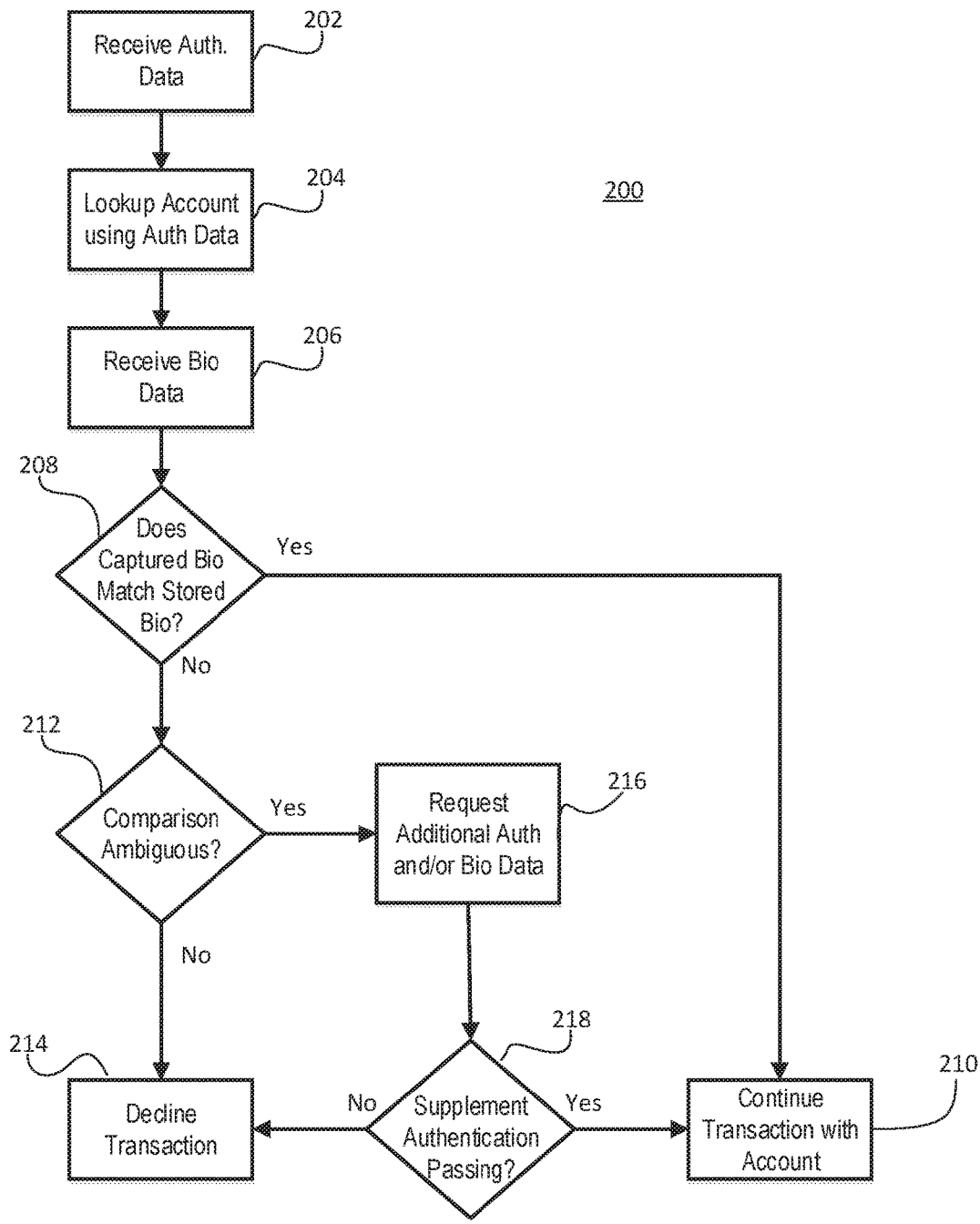
FIG. 2 illustrates a process for authenticating transaction account holders without a card associated with the account and/or identification, in accordance with various embodiments.

With reference to FIG. 2, an example process 200 is shown for authorizing transactions for a transaction account holder without needing a card or device associated with the transaction account, according to various embodiments. Process 200 is illustrated as executing on bank server 108, though all or a portion of the process may also be executed at computing device 102 or other devices, in accordance with various embodiments. Bank server 108 may receive authentication data from authentication device 106 and/or computing device 102 (Block 202) in association with a request to complete a transaction. A customer may thus choose an account, enter an associated PIN or password, and go through biometric authentication, for example. The biometric data may be transmitted in a cryptogram and/or separately for authentication.

For example, a hotel may have a terminal at which a user may sign into an account with the bank using authentication data including a user name and password. Authentication data may also be in the form of a scratch pad having a predetermined set of inputs that map to an account. For example, the scratch pad may be a string including username with the last 4 of SSN appended, and may map to an account. An account holder may be prompted for the scratch pad at the point-of-sale so the scratch pad may change for the varying biometric transactions. The POS may be an existing POS having biometric capture capabilities and updated with software to enable the functionality described herein. Older POS devices without biometric capture capabilities may also integrate hardware updates and/or replacements to enable biometric capture capabilities.

Bank server 108 may look up a transaction account using the authentication data (Block 204). The method of input can be communicated to a fraud and risk engine to assess risk associated with the transaction. The bank server may use the authentication data as criteria in a query to identify an account matching the criteria. The account matching the criteria may also have biometric data associated with the account. Continuing the above example, the bank may send to the hotel a bPAN associated with the user account for use with biometric authentication.

In various embodiments, bank server 108 may receive biometric data captured by biometric device 104 (Block 206). The biometric data may be received in the form of a template, an image, a recording, or other format suitable for deriving or containing derived biometric data. In response to receiving biometric data in image or other raw form, bank server 108 may convert the image to a template suitable for comparison to a stored biometric template.

Bank server 108 may compare the biometric data stored in association with the transaction account to the biometric data captured at biometric device 104 to determine whether the stored biometric data matches the captured biometric data (Block 208). A biometric template may be any digital representation of biometric data in non-image form. For example, a series of fingerprint templates may directly store fingerprint data and indirectly store gesture data. For further explanation of security based on fingerprints and gestures see U.S. patent application Ser. No. 14/860,375, entitled "SYSTEMS AND METHODS FOR GESTURE BASED BIOMETRIC SECURITY," which is incorporated herein in its entirety.

In another example, a facial template may store facial biometric data representative of facial landmarks and features. Landmarks and features may include relative position, size, and/or shape of the eyes, nose, cheekbones, and jaw and the texture and/or color of the eyes, skin, hair, or other identifiable features. For further explanation of authenticating based on facial recognition see U.S. patent application Ser. No. 14/273,225, entitled "SYSTEMS AND METHODS FOR AUTHENTICATING FACIAL BIOMETRIC DATA AGAINST SECONDARY SOURCES," which is incorporated herein in its entirety.

In various embodiments, bank server 108 may continue a transaction using the looked-up account in response to the received biometric data matching with the stored and looked-up biometric data (Block 210). The transaction may also be evaluated on supplementary criteria. For example, the cardless-payment process may be restricted to registered accounts. For unregistered accounts, the cardless-payment process may only be enabled at a limited subset of merchants and/or within limited spending limits. For example, cardless transactions may be approved for food, lodging, and transportation as an emergency measure but declined in other market segments. Such limitations may be set by an account holder during registration, or may be automatically imposed for account holders who have not opted-in to the cardless program beyond emergency use.

In response to the received biometric data conflicting with the stored and looked-up biometric data, bank server 108 may check whether the result of the comparison between the received biometric data and the lookup biometric data is ambiguous (Block 212). In response to a strong likelihood that the biometric data does not match or the risk of the transaction is unacceptable, bank server 108 may decline the transaction (Block 214).

In response to an ambiguous result from the comparison, the bank may request additional authentication and/or biometric data (Block 216). An ambiguous result may be characterized by lacking enough data or score to authenticate a transaction. A risky transaction may be characterized by risk markers. Examples of risk markers include, for example, a password entry device without protection or a velocity transaction that seems unlikely such as a user conducting two transactions in a short amount of time between to geographic locations that are significantly separated by distance. Bank server 108 may use the additional data to authenticate the individual associated with the transaction account by comparing the additional data to known data associated with the account. Bank server 108 may decline the transaction in response to the step-up authentication failing (Block 214). In response to the step-up authentication passing, bank server 108 may continue the transaction with the account (Block 210). In continuing the transaction with the account, bank server 108 may apply additional criteria to evaluate risk, account settings, domain restriction controls for cardless transactions, or other criteria prior to authorizing a transaction.

Figure 3:
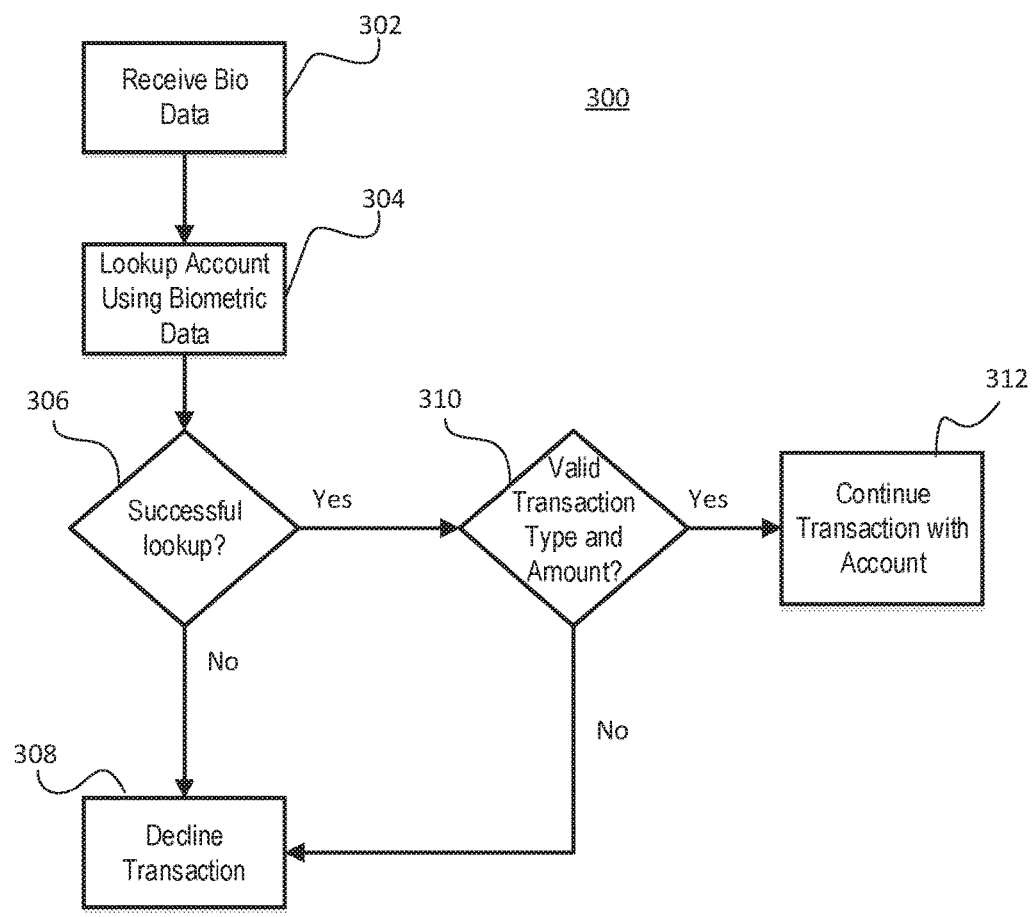
FIG. 3 illustrates a method of approving transactions for an account holder without a bank issued card based on biometrics, passcodes, and/or personal information, in accordance with various embodiments.

Referring now to FIG. 3, an example process 300 is shown for authorizing transactions for a transaction account holder without needing a card or device associated with the transaction account, in accordance with various embodiments. Process 300 is illustrated as executing on bank server 108, though all or a portion of the process may also be executed at computing device 102 in various embodiments. Bank server 108 may receive biometric data from biometric device 104 and/or computing device 102 (Block 302). The biometric data may be converted to a template prior to transmission from computing device 102 to bank server 108. The biometric data may also be transmitted to bank server 108 in a raw format such as an image or a scan for conversion to a template or other format suitable for comparison to stored biometric data.

In various embodiments, bank server 108 may look up a transaction account using the biometric data (Block 304). The biometric data may be used as criteria in a query to retrieve account details from a data store, for example. More than one biometric identifier may be used in order to limit the possibility of false positives allowing for duplicate authentications. For example, the combination of fingerprint, retinal scan, and facial recognition from an individual may be used to lookup a transaction account belonging to the individual. Additionally, the biometric data may be supplemented with authentication data such as a username and password, as described above.

Bank server 108 may determine whether the lookup was successful (Block 306). Bank server 108 may decline the transaction in response to the lookup being unsuccessful (Block 308). Bank server 108 may detect an unsuccessful lookup by submitting a search query using the biometric data and/or authentication data as criteria and receiving an empty results set. Bank server 108 may also detect an unsuccessful lookup by submitting a search query using the biometric data and/or authentication data as criteria and receiving a result set having accounts belonging to more than one individual.

In response to the lookup being successful, bank server 108 may determine whether the transaction type, amount, and/or other characteristics are valid for biometric-based transactions on the associated account (Block 310). The account associated with the biometric data may also include domain restriction controls for the use of the card-free, biometric-based payments. For example, the account may include a daily, total, weekly, or other spending limit on biometric-based transactions. The account may also restrict biometric-based transactions to limited merchant segments in case of emergency such as, for example, food, medical, transportation, or lodging.

In response to the transaction being invalid, bank server 108 may decline the transaction (Block 308). In response to the transaction characteristics indicating the transaction is valid, bank server 108 may continue the transaction with the identified account (Block 312). Continuing the transaction may include transmitting to a merchant a bPAN as described above for use in generating a cryptogram capable of using standard payment authorization systems. The bPAN may function in a credit authorization ecosystem in a manner similar to a digital PAN (DPAN) bound to a mobile device.

The bPAN may be mapped to a PAN, which may serve as a key field for the associated transaction account to access account details, authentication data, and/or other biometric data stored in a database. A user may also provide authentication data such as a user name and password to log into a biometric transaction system, with the username being used as a key field for the associated transaction account. Any databases discussed herein may include relational, hierarchical, graphical, blockchain, object-oriented structure and/or any other database configurations. Common database products that may be used to implement the databases include DB2 by IBM® (Armonk, N.Y.), various database products available from ORACLE® Corporation (Redwood Shores, Calif.), MICROSOFT® Access® or MICROSOFT® SQL Server® by MICROSOFT® Corporation (Redmond, Wash.), MySQL by MySQL AB (Uppsala, Sweden), MongoDB®, Redis®, Apache Cassandra®, or any other suitable database product. Moreover, the databases may be organized in any suitable manner, for example, as data tables or lookup tables. Each record may be a single file, a series of files, a linked series of data fields or any other data structure. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc. In that regard, bank servers 108 may look up, generate, or otherwise retrieve a bPAN associated with a transaction account and send the bPAN to the merchant for use in authorizing a transaction.

The cardless payment systems and methods described herein may be vulnerable to attacks including spoofing, tampering, repudiation, information disclosure, denial of service, and escalation of privilege, for example. Point-of-sale terminals may not be under the control of customers and may be rogue terminals. Terminal authentication may thus provide additional security for entry of biometric data and/or authentication data. Terminals may leverage a security solution such as that available under the trade name SECURE-MATRIX, which is available at http://cse-America.com/.

The disclosure and claims do not describe only a particular outcome of cardless transactions, but the disclosure and claims include specific rules for implementing the outcome of cardless transactions and that render information into a specific format that is then used and applied to create the desired results of cardless transactions, as set forth in *McRO, Inc. v. Bandai Namco Games America Inc.* (Fed. Cir. Case number 15-1080, Sep. 13, 2016). In other words, the outcome of cardless transactions can be performed by many different types of rules and combinations of rules, and this disclosure includes various embodiments with specific rules. While the absence of complete preemption may not guarantee that a claim is eligible, the disclosure does not sufficiently preempt the field of cardless transactions at all. The disclosure acts to narrow, confine, and otherwise tie down the disclosure so as not to cover the general abstract idea of just cardless transactions. Significantly, other systems and methods exist for cardless transactions, so it would be inappropriate to assert that the claimed invention preempts the field or monopolizes the basic tools of cardless transactions. In other words, the disclosure will not prevent others from cardless transactions, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the system and method may include alerting a subscriber when their computer is offline. The system may include generating customized information and alerting a remote subscriber that the information can be accessed from their computer. The alerts are generated by filtering received information, building information alerts and formatting the alerts into data blocks based upon subscriber preference information. The data blocks are transmitted to the subscriber's wireless device which, when connected to the computer, causes the computer to auto-launch an application to display the information alert and provide access to more detailed information about the information alert. More particularly, the method may comprise providing a viewer application to a subscriber for installation on the remote subscriber computer; receiving information at a transmission server sent from a data source over the Internet, the transmission server comprising a microprocessor and a memory that stores the remote subscriber's preferences for information format, destination address, specified information, and transmission schedule, wherein the microprocessor filters the received information by comparing the received information to the specified information; generates an information alert from the filtered information that contains a name, a price and a universal resource locator (URL), which specifies the location of the data source; formats the information alert into data blocks according to said information format; and transmits the formatted information alert over a wireless communication channel to a wireless device associated with a subscriber based upon the destination address and transmission schedule, wherein the alert activates the application to cause the information alert to display on the remote subscriber computer and to enable connection via the URL to the data source over the Internet when the wireless device is locally connected to the remote subscriber computer and the remote subscriber computer comes online.

In various embodiments, the system and method may include a graphical user interface for dynamically relocating/rescaling obscured textual information of an underlying window to become automatically viewable to the user. By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., email) to prevent a computer from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which thus forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

In various embodiments, the system may also address the problem of retaining control over customers during affiliate purchase transactions, using a system for co-marketing the "look and feel" of the host web page with the product-related content information of the advertising merchant's web page. The system can be operated by a third-party outsource provider, who acts as a broker between multiple hosts and merchants. Prior to implementation, a host places links to a merchant's webpage on the host's web page. The links are associated with product-related content on the merchant's web page. Additionally, the outsource provider system stores the "look and feel" information from each host's web pages in a computer data store, which is coupled to a computer server. The "look and feel" information includes visually perceptible elements such as logos, colors, page layout, navigation system, frames, mouse-over effects or other elements that are consistent through some or all of each host's respective web pages. A customer who clicks on an advertising link is not transported from the host web page to the merchant's web page, but instead is redirected to a composite web page that combines product information associated with the selected item and visually perceptible elements of the host web page. The outsource provider's server responds by first identifying the host web page where the link has been selected and retrieving the corresponding stored "look and feel" information. The server constructs a composite web page using the retrieved "look and feel" information of the host web page, with the product-related content embedded within it, so that the composite web page is visually perceived by the customer as associated with the host web page. The server then transmits and presents this composite web page to the customer so that she effectively remains on the host web page to purchase the item without being redirected to the third party merchant affiliate. Because such composite pages are visually perceived by the customer as associated with the host web page, they give the customer the impression that she is viewing pages served by the host. Further, the customer is able to purchase the item without being redirected to the third party merchant affiliate, thus allowing the host to retain control over the customer. This system enables the host to receive the same advertising revenue streams as before but without the loss of visitor traffic and potential customers. More particularly, the system may be useful in an outsource provider serving web pages offering commercial opportunities. The computer store containing data, for each of a plurality of first web pages, defining a plurality of visually perceptible elements, which visually perceptible elements correspond to the plurality of first web pages; wherein each of the first web pages belongs to one of a plurality of web page owners; wherein each of the first web pages displays at least one active link associated with a commerce object associated with a buying opportunity of a selected one of a plurality of merchants; and wherein the selected merchant, the outsource provider, and the owner of the first web page displaying the associated link are each third parties with respect to one other; a computer server at the outsource provider, which computer server is coupled to the computer store and programmed to: receive from the web browser of a computer user a signal indicating activation of one of the links displayed by one of the first web pages; automatically identify as the source page the one of the first web pages on which the link has been activated; in response to identification of the source page, automatically retrieve the stored data corresponding to the source page; and using the data retrieved, automatically generate and transmit to the web browser a second web page that displays: information associated with the commerce object associated with the link that has been activated, and the plurality of visually perceptible elements visually corresponding to the source page.

Systems, methods and computer program products are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Terms and phrases similar to "associate" and/or "associating" may include tagging, flagging, correlating, using a look-up table or any other method or system for indicating or creating a relationship between elements, such as, for example, (i) a transaction account and (ii) an item (e.g., offer, reward, discount) and/or digital channel. Moreover, the associating may occur at any point, in response to any suitable action, event, or period of time. The associating may occur at pre-determined intervals, periodic, randomly, once, more than once, or in response to a suitable request or action. Any of the information may be distributed and/or accessed via a software enabled link, wherein the link may be sent via an email, text, post; social network input and/or any other method known in the art.

Phrases and terms similar to "transaction account" may include any account that may be used to facilitate a financial transaction.

Phrases and terms similar to "financial institution" or "bank" may include any entity that offers transaction account services. Although often referred to as a "financial institution," the financial institution may represent any type of bank, lender or other type of account issuing institution, such as credit card companies, card sponsoring companies, or third party issuers under contract with financial institutions. It is further noted that other participants may be involved in some phases of the transaction, such as an intermediary settlement institution.

The phrases consumer, customer, user, account holder, account affiliate, cardmember or the like shall include any person, entity, business, government organization, business, software, hardware, machine associated with a transaction account, buys merchant offerings offered by one or more merchants using the account and/or who is legally designated for performing transactions on the account, regardless of whether a physical card is associated with the account. For example, the cardmember may include a transaction account owner, a transaction account user, an account affiliate, a child account user, a subsidiary account user, a beneficiary of an account, a custodian of an account, and/or any other person or entity affiliated or associated with a transaction account.

Any communication, transmission and/or channel discussed herein may include any system or method for delivering content (e.g. data, information, metadata, etc), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE®.pdf document, etc.), an "ebook," an "emagazine," an application or microapplication (as described herein), an SMS or other type of text message, an email, facebook, twitter, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

A "consumer profile" or "consumer profile data" may comprise any information or data about a consumer that describes an attribute associated with the consumer (e.g., a preference, an interest, demographic information, personally identifying information, and the like).

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations. Useful machines for performing the various embodiments include general purpose digital computers or similar devices.

In fact, in various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system. After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEB SPHERE, WEB LOGIC, JBOSS, EDB® Postgres Plus Advanced Server® (PPAS), etc.). In various embodiments, the server may include web servers (e.g. APACHE, IIS, GWS, SUN JAVA® SYSTEM WEB SERVER).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

Practitioners will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS®/CE/Mobile, OS2, UNIX®, LINUX®, SOLARIS®, MacOS, etc.) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT, active server pages (ASP), common gateway interface scripts (CGI), extensible markup language (XML), dynamic HTML, cascading style sheets (CSS), AJAX (Asynchronous JAVASCRIPT And XML), helper applications, plug-ins, and the like. A server may include a web service that receives a request from a web server, the request including a URL and an IP address (123.56.789.234). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated by reference. For example, representational state transfer (REST), or RESTful, web services may provide one way of enabling interoperability between applications.

As used herein, the term "network" includes any cloud, cloud computing system or electronic communications system or method which incorporates hardware and/or software components. Communication among the parties may be accomplished through any suitable communication channels, such as, for example, a telephone network, an extranet, an intranet, Internet, point of interaction device (point of sale device, personal digital assistant (e.g., IPHONE®, BLACKBERRY®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, APPLE® talk, IP-6, NetBIOS®, OSI, any tunneling protocol (e.g. Ipsec, SSH), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA® 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Service Provider (ISP) over the local loop as is typically used in connection with standard modem communication, cable modem, Dish Networks®, ISDN, Digital Subscriber Line (DSL), or various wireless communication methods, see, e.g., GILBERT HELD, UNDERSTANDING DATA COMMUNICATIONS (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand. For more information regarding cloud computing, see the NIST's (National Institute of Standards and Technology) definition of cloud computing at http://csrc.nist.gov/publications/nistpubs/800-145/SP800-145.pdf (last visited June 2012), which is hereby incorporated by reference in its entirety.

As used herein, "transmit" may include sending electronic data from one system component to another over a network connection. Additionally, as used herein, "data" may include encompassing information such as commands, queries, files, data for storage, and the like in digital or any other form.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C@, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "JAVA® Cryptography" by Jonathan Knudson, published by O'Reilly & Associates (1998); (3) "Cryptography & Network Security: Principles & Practice" by William Stallings, published by Prentice Hall; all of which are hereby incorporated by reference.

In various embodiments, the software elements of the system may also be implemented using Node.Js®. Node.Js® may implement several modules to handle various core functionalities. For example, a package management module, such as Npm®, may be implemented as an open source library to aid in organizing the installation and management of third-party Node.Js® programs. Node.Js® may also implement a process manager, such as, for example, Parallel Multithreaded Machine ("PM2"); a resource and performance monitoring tool, such as, for example. Node Application Metrics ("appmetrics"); a library module for building user interfaces, such as for example ReachJS®; and/or any other suitable and/or desired module.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims. Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
receiving, by a bank server and from a computing device, a request to complete a transaction including authentication data associated with a transaction account and a captured biometric template,
wherein the computing device converts the biometric data to the captured biometric template,
wherein the authentication data is in a form of a scratch pad having a predetermined set of inputs that map to the transaction account, and
wherein the scratch pad changes based on the captured biometric template;
identifying, by the bank server, the transaction account using the authentication data associated with the transaction account, wherein the transaction account is associated with a stored biometric template stored in a biometric data store;
comparing, by the bank server, the stored biometric template with the captured biometric template; and
determining, by the bank server, to approve or decline the transaction in response to the comparing the stored biometric template with the captured biometric template.

2. The method of claim 1, further comprising transmitting, by the bank server, a bPAN to the computing device in response to the stored biometric template matching the captured biometric template.

3. The method of claim 2, wherein the bPAN has domain restriction controls based on at least one of a period, an amount, or a merchant segment.

4. The method of claim 3, further comprising authenticating, by the bank server, a user associated with the transaction account using at least one of an iris scan, a fingerprint scan, vocal scan, a gesture or facial scan.

5. The method of claim 4, further comprising receiving, by the bank server, a payment cryptogram including characteristics of the transaction and generated using the bPAN associated with the transaction account.

6. The method of claim 5, wherein the determining to decline is based on risk markers including at least one of a password entry device without protection or a velocity transaction wherein a user conducts two transactions in a short amount of time between two geographic locations that are significantly separated by distance.

7. The method of claim 6, wherein the determining to approve is based on the transaction account being registered.

8. The method of claim 7, further comprising requesting, by the bank server, a step-up authentication in response to the stored biometric template differing from the captured biometric template.

9. The method of claim 8, further comprising prompting, by the bank server and at a point of sale device, for the scratch pad.

10. A computer-based system, comprising:
a processor;
a tangible, non-transitory memory configured to communicate with the processor, the tangible, non-transitory memory having instructions stored thereon that, in response to execution by the processor, cause a bank server to perform operations comprising:
receiving, by the bank server and from a computing device, a request to complete a transaction including authentication data associated with a transaction account and a captured biometric template,
wherein the computing device converts the biometric data to the captured biometric template,
wherein the authentication data is in a form of a scratch pad having a predetermined set of inputs that map to the transaction account, and
wherein the scratch pad changes based on the captured biometric template;
identifying, by the bank server, the transaction account using the authentication data associated with the transaction account, wherein the transaction account is associated with a stored biometric template stored in a biometric data store;
comparing, by the bank server, the stored biometric template with the captured biometric template; and determining, by the bank server, to approve or decline the transaction in response to the comparing the stored biometric template with the captured biometric template.

11. The computer-based system of claim 10, wherein the operations further comprise transmitting, by the bank server, a bPAN to the computing device in response to the stored biometric template matching the captured biometric template.

12. The computer-based system of claim 11, wherein the bPAN has domain restriction controls based on at least one of a period, an amount, or a merchant segment.

13. The computer-based system of claim 10, wherein the operations further comprise authenticating, by the bank server, a user associated with the transaction account using at least one of an iris scan, a fingerprint scan, vocal scan, a gesture or facial scan.

14. The computer-based system of claim 10, wherein the operations further comprise receiving, by the bank server, a payment cryptogram including characteristics of the transaction and generated using a bPAN associated with the transaction account.

15. The computer-based system of claim 10, wherein the determining to decline is based on risk markers including at least one of a password entry device without protection or a velocity transaction wherein a user conducts two transactions in a short amount of time between two geographic locations that are significantly separated by distance.

16. The computer-based system of claim 15, wherein the determining to approve is based on the transaction account being registered.

17. The computer-based system of claim 10, further comprising requesting, by the bank server, a step-up authentication in response to the stored biometric template differing from the captured biometric template.

18. An article of manufacture including a non-transitory, tangible computer readable storage medium having instructions stored thereon that, in response to execution by a computer-based system, cause the computer-based system to perform operations comprising:
  receiving, by the computer-based system and from a computing device, a request to complete a transaction including authentication data associated with a transaction account and a captured biometric template,
  wherein the computing device converts the biometric data to the captured biometric template,
  wherein the authentication data is in a form of a scratch pad having a predetermined set of inputs that map to the transaction account, and
  wherein the scratch pad changes based on the captured biometric template;
  identifying, by the computer-based system, the transaction account using the authentication data associated with the transaction account, wherein the transaction account is associated with a stored biometric template stored in a biometric data store;
  comparing, by the computer-based system, the stored biometric template with the captured biometric template; and
  determining, by the computer-based system, to approve or decline the transaction in response to the comparing the stored biometric template with the captured biometric template.

19. The article of claim 18, wherein the operations further comprise transmitting, by the computer-based system, a bPAN to the computing device in response to the stored biometric template matching the captured biometric template.

20. The article of claim 18, wherein the operations further comprise authenticating, by the computer-based system, a user associated with the transaction account using at least one of an iris scan, a fingerprint scan, vocal scan, gesture or facial scan.

* * * * *